(12) United States Patent
Eisses (10) Patent No.: US 10,136,044 B2
(45) Date of Patent: Nov. 20, 2018

(54) METHOD, APPARATUS, AND SYSTEM FOR COMMUNICATING INFORMATION OF SELECTED OBJECTS OF INTEREST DISPLAYED IN A VIDEO-CHAT APPLICATION

(71) Applicant: salesforce.com, inc., San Francisco, CA (US)

(72) Inventor: Aaron Eisses, Halifax (CA)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/438,860

(22) Filed: Feb. 22, 2017

(65) Prior Publication Data

US 2018/0241930 A1 Aug. 23, 2018

(51) Int. Cl.
| | |
|---|---|
| *H04N 5/14* | (2006.01) |
| *H04N 5/232* | (2006.01) |
| *H04N 7/14* | (2006.01) |
| *H04N 5/272* | (2006.01) |
| *G06F 17/30* | (2006.01) |
| *G06N 99/00* | (2010.01) |
| *H04N 7/15* | (2006.01) |

(52) U.S. Cl.
CPC ..... *H04N 5/23206* (2013.01); *G06F 17/3079* (2013.01); *G06N 99/005* (2013.01); *H04N 5/23216* (2013.01); *H04N 5/23296* (2013.01); *H04N 5/272* (2013.01); *H04N 7/147* (2013.01); *H04N 7/15* (2013.01)

(58) Field of Classification Search
USPC ........................................... 348/14.03
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

*Primary Examiner* — Amal Zenati
(74) *Attorney, Agent, or Firm* — Lorenz & Kopf, LLP (57) ABSTRACT

A method, apparatus and system for sharing object information which executes a video-chat session between an agent and a mobile client using an application hosted by a server. There is presented a view in common executed by a server application to both the agent and the mobile client for viewing objects captured by the mobile client during the video-chat session. There is identified by the agent a viewed object captured by the mobile client where the captured objected has been viewed by the agent in the common view during the video-chat session. The captured objected may be selected by the agent during the video-chat session and the agent may retrieve information remotely about the selected object to send to the mobile client.

20 Claims, 7 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,185,342 B2 | 11/2015 | Isaacs |
| 9,444,857 B2 | 9/2016 | Isaacs |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0175924 A1* | 11/2002 | Yui ............................ G06F 3/14 345/660 |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0008535 A1* | 1/2010 | Abulafia ............... G06K 9/2054 382/100 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2012/0306734 A1* | 12/2012 | Kim ........................ G06F 3/011 345/156 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0098176 A1* | 4/2014 | Isaacs ..................... H04W 4/60 348/14.01 |
| 2015/0248215 A1* | 9/2015 | Graf ..................... G06F 3/04812 715/822 |
| 2017/0054772 A1 | 2/2017 | Isaacs |

* cited by examiner

METHOD, APPARATUS, AND SYSTEM FOR COMMUNICATING INFORMATION OF SELECTED OBJECTS OF INTEREST DISPLAYED IN A VIDEO-CHAT APPLICATION

TECHNICAL FIELD

Embodiments of the subject matter described herein relate generally to on-demand real-time communication over peer-to-peer connections. More particularly, embodiments of the subject matter relate to a method, apparatus and system to identify, capture and exchange viewed object information in video-chat apps between a mobile client and agent.

BACKGROUND

Currently, on-demand in-app buttons are used to integrate live agent support directly in mobile apps and webpages. These on demand in-app buttons enable mobile clients to facilitate fast engagements by providing a convenient means of requesting from a mobile device in which the mobile client is operating on-demand services by merely actuating the on-demand in-app button on the mobile client. From this button actuation a request is executed in an instant to initiate an on-demand video-chat session with an agent remotely located. Hence, upon actuating the in-app button, a video-chat session is initiated between the mobile client and agent, and a one-to-one seamless communication connection is created in one step. The mobile client can receive immediate real-time customer support in the video-chat session from the agent.

In addition, the on-demand in-app buttons allows for enhanced personalized viewing experiences from the mobile client by providing 360° views between the agent and the mobile client in such on-demand in-app video-chat sessions. Additionally, in the 360° views of the in-app video-chat sessions, there is a one-to-one correspondence in the viewing experience between both parties, that is, the mobile client views substantially the same display of imagery as what the agent views. Nevertheless, even though there is a common or shared view displayed to both parties, limitations become apparent in the ability of the kind of information that can be identified, accessed, collectively discussed and shared between the parties. The shared viewing experience is not capitalized upon, rather communications exchanged back and forth are generally limited to voice or text messaging between the parties and not sharing of additional information such as object images viewed in the mobile client and agent displays.

Accordingly, it is desirable to capitalize on the shared viewing experiences in such video-chat sessions between the agent and mobile client by configuring the on-demand in-app application to allow selecting and sharing of object data. In one instance, it is desired for the on-demand video-chat in-app to have touch functionality for selecting objects by the agent to be viewed by the mobile client. In other instances, it is desired for enabling by touch functions, a collecting of related object information on the part of the agent during an in-app video-chat session. In such instances, it is desired for the agent to identify and highlight objects displayed and further retrieve remote information about such identified objects to share in the shared view or share by other means with the mobile client. For example, it is desired to enable the agent to direct camera operation of the mobile client so the agent can choose objects of interest displayed and highlight such objects for better viewing by both parties and add labeling and other nomenclature to the object of interest for further discussions.

It is desirable to exchange information using a multi-tenant platform for sharing image database information during the in-app video-chat. In an exemplary example, it is desired to configure the in-app video-chat applications to enable the agent to access information from a database associated with the multi-tenant platform relating to object images identified during the viewing experience between both parties. Hence, it is desirable in the in-app video-chat session to allow for more types of interaction than simply the customary voice and text messaging when communicating on-demand. Such additional information exchanges are directed to object images which can be generated by using camera operations available on devices of the mobile client. For example, it is desired on the mobile client in conjunction with the 360° viewing operations of the mobile client that additional interactive object image oriented tools be integrated for use during the in-app video-chat sessions. For example, these tools are directed to assist agents to access camera operations of the client device and can enable the agent to immediately identify viewed objects of interest during the video-chat session for further review, sharing, and information collection.

In addition, it is desirable to initiate computer vision software applications by a customer agent when making a physical touch or selection of the object in the shared view and to execute the computer vision software applications, which may be hosted by the server or mobile client, for detecting and determining image features of the object around a touch point. In addition, it is desirable to apply color changes or transforms for better contrasting the selected image object from the surroundings in the shared view. Also, it is desirable to apply machine learning applications to information about the image object by the agent to get more information about the selected object to send to the mobile client.

It is desirable to use a multi-tenant cloud-based architectures to improve collaboration, integration, and community-based cooperation between agents within tenant organizations without sacrificing data security. Multi-tenancy refers to a system where a single hardware and software platform simultaneously supports multiple user groups (also referred to as "organizations" or "tenants") from a common data storage element (also referred to as a "multi-tenant database").

The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
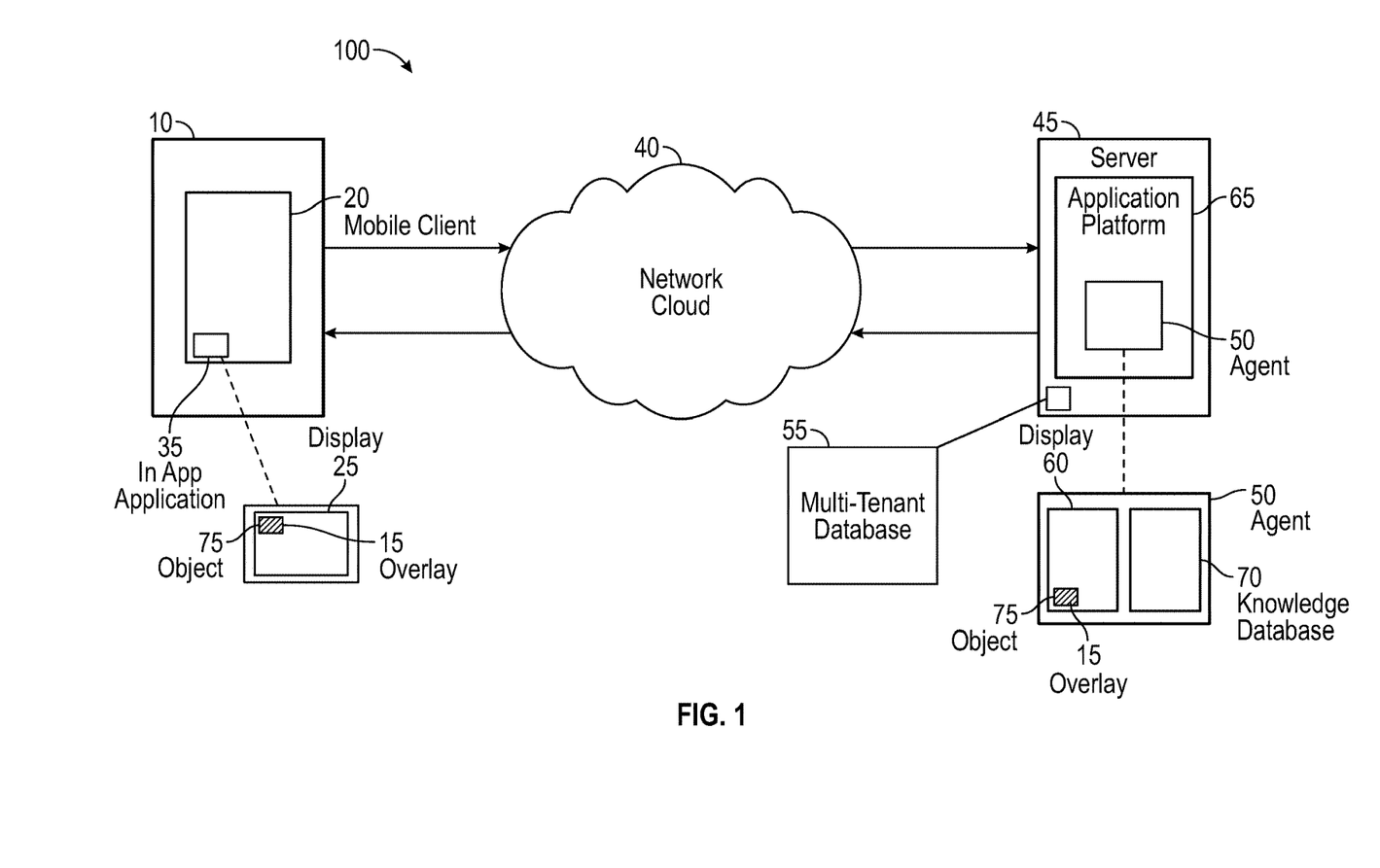
FIG. 1 is an exemplary functional diagram illustrating the communication process between the mobile client and agent in accordance with an embodiment.

With reference to FIG. 1, FIG. 1 is an exemplary functional diagram illustrating the communication of the mobile client and agent process in accordance with an embodiment. A cloud based network system 100 including the components of a mobile device 10 communicating via a network cloud 40 to a server 45 for supporting a video-chat app which operates on-demand with communicating via the network cloud 40 to the mobile device 10 and the hosted by server 45. The network cloud 40 can include interconnected networks including both wired and wireless networks for enabling communications of the mobile device 10 via a mobile client 20 to the agent 50 hosted by server 45. For example, wireless networks may use a cellular-based communication infrastructure that includes cellular protocols such as code division multiple access "CDMA", time division multiple access "TDMA", global system for mobile communication "GSM", general packet radio service "GPRS", wide band code division multiple access "WCDMA" and similar others. Additionally, wired networks include communication channels such as the IEEE 802.11 standard better known as "Wi-Fi", the IEEE 802.16 standard better known as "WiMAX", and the IEEE 802.15.1 better known as "Bluetooth". The network cloud 40 allows access to communication protocols and application programming interfaces that enable real-time communication over peer-to-peer connections. As an example, this may include protocols from open source software packages for real-time video-chat communications over a cloud based network system 100 as described here. The web real-time Communication "WebRTC", which is an open source software package for real-time voice and video on the web, can depending on the version be integrated in the Chrome, IOS, Explorer, Safari and other browsers for peer-to-peer communications. Additionally, WebRTC can enable in-app video-chat communications through different browsers through a uniform standard set of APIs. Hence, the cloud based network system 100 allows for access for the communication of information with providers of WebRTC during the on-demand peer-to-peer communications in in-app applications such as a video-chat app used in a mobile client 20.

The mobile device 10 includes the mobile client 20 which use a mobile software development kit "SDK" platform. This SDK platform can provide one step activation of an on-demand services via the in-app application 35 such as shown here of the mobile client 20 and a button type user interface "UI" of the in-app application 35 for activating the on-demand service. The mobile device 10 may include any mobile or connected computing device including "wearable mobile devices" having an operating system capable of running mobile apps individually or in conjunction with other mobile or connected devices. Examples of "wearable mobile devices" include Google Glass® and Android® watches. Additionally, connected device may include devices such as cars, jet engines, home appliances, tooth brushes, light sensors, air conditioning systems. Typically, the device will have display capabilities such as a display screens and also may have associated keyboard functionalities or even a touchscreen providing a virtual keyboard and buttons or icons on a display. Many such devices can connect to the internet and interconnect with other devices via Wi-Fi, Bluetooth or other near field communication (NFC) protocols. Also, the use of cameras integrated into the interconnected devices and GPS functions can be enabled.

The mobile client 20 may additionally include other in-app applications as well as SDK app platform tools and further can be configurable to enable downloading and updating of SDK app platform tools. In addition, the mobile client 20 uses an SDK platform which may be configurable for a multitude of mobile operating systems including Android, Apple iOS, Google Android, Research in Motion's BlackBerry OS, Nokia's Symbian, Hewlett-Packard's webOS (formerly Palm OS) and Microsoft's Windows Phone OS etc . . . .

The in-app application 35 of the mobile client 20 provided on the SDK platform can be found and downloaded by communicating with an on-line application market platform for apps and in-apps which is configured for the identifying, downloading and distribution of apps which are prebuilt. One such example is the Salesforce AppExchange® which is an online application market platform for apps and in-apps where the downloading, and installing of the pre-built apps and components such as an in-app application 35 for the mobile client 20 with video-chat features can be downloaded.

In addition, these on-line application market platforms include "snap-in" agents for incorporation in the pre-built apps that are made available. The in-app application 35 may be configured as a "snap-in" agent where the snap-in agent is considered by the name to be a complete SDK packages that allows for "easy to drop" enablement in the mobile client 20 or in webpages. An example of a "snap-in" agent is the "Salesforce® SOS" which is a snap-in agent hosted by the Salesforce ServiceCloud® and enables an UI configured as a button to be embedded into the mobile client 20. The UI button provides an instantaneous connection directly to the agent 50 and provides on-demand live audio or video support and on-display guided assistance. In this example, the complete SDK snap-in agent provides the in-app application 35 with one-touch access to a customer support agent, as well as display sharing with the mobile client 20. That is, in this instance there is a customer support agent provided in video-chat communications of the in-app application 35 on the mobile device 10. This is provided by the Salesforce ServiceCloud® that enables customer support agents to have video-chat face to face sessions with customers using the mobile client 20 in real time.

The server 45 acts as a host and includes the agent 50 that is configured for access by an application platform 65. The application platform 65 can be configured as a platform as a service ("Paas") that provides a host of features to develop, test, deploy, host and maintain-applications in the same integrated development environment of the application platform. Additionally, the application platform 65 may be part of a multi-tenant architecture where multiple concurrent users utilize the same development applications installed on the application platform 65. Also, by utilizing the multi-tenant architecture in conjunction with the application platform 65 integration with web services and databases via common standards and communication tools can be configured. As an example, Salesforce ServiceCloud® is an application platform residing on the server 45 that hosts the agent 50 and may host all the varying services needed to fulfil the application development process of the agent 50. The Salesforce ServiceCloud® as an example, may provide web based user interface creation tools to help to create, modify, test and deploy different UI scenarios of the agent 50.

The application platform 65 includes applications relating to the agent 50. The agent 50 is an application that communications with the mobile client 20, more specifically provides linking via the WebRTC to the mobile client 20 for video-chat communications. The agent 50 may include other applications in communication for accessing a multi-tenant database 55 as an example, in a multi-tenant database system. In addition, the agent 50 may configurable to include UIs to display video-chat communication. In an exemplary embodiment, the display 60 which present the same view in the agent user interface of the application of the agent. The Salesforce ServiceCloud® platform is an application platform 65 that can host applications of an agent 50 for communication with an in-app application 35 of the mobile client 20. The display 60 may include sensing touch features that allows customer agents to touch object images viewed by the customer agent in the display. The customer agent by touch sends a signal to the in-app application 35 of the mobile client 20. The object is located that encompasses the touch point using computer vision software applications that uses computer vision techniques among them image smoothing and edge detection to detect the edges of the object image for the object location.

The display can be configured to be a shared display. For example, in Salesforce® SOS™ in-app functions can control display sharing by using an object linked to display sharing settings on a manager, in this case a change may be performed in the mobile client 20 associated with the video-chat session.

With continuing reference to FIG. 1, the display 60 of the agent 50 includes image layering functions of an object 75 selected by the agent. For example, the agent 50 selects the object 75 and an overlay 15 of the object 75 is overlaid using the computer vision applications and shown on the display 60 so the agent 50 receives a visual notification of the object 75 selected. Additionally, because the display 60 is shared, the object 75 overlay is also displayed on the display 25 of the mobile client 20. Given that both displays may not be of the same size, the object 75 is scaled accordingly in either display, that is the object 75 may appear scaled larger in the display 60 of the agent 50 or vice versa in the display 25 of the mobile client 20. Hence, the overlay 15 supports functionality both on the mobile client 20 and the agent 50.

Additionally, the overlay 15 is integrated into functions of the snap-in agent, that is it is the overlay 15 is part of the operation of the software development kit "SDK" allowing the overlay to be embedded in a multitude of mobile in-app user interfaces and agent user interfaces hence, enabling the displays of either agent 50 or the mobile client 20 to easily be configured to include the snap-in objects as overlay. The object display similar to the SOS button may be a floating display allowing the mobile client or agent to re-position the overlay on the display. The overlay of the object 75 may be coordinated with the display 60 of the object 75 enabling the agent 50 or mobile client 20 to move the object 75 on either of the shared views on both displays.

Additionally, the application platform 65 has access to other databases for information retrieval and include a knowledge database 70 where both agents and customers alike can search for the answers they need. The knowledge database 70 may be part of the multi-tenant database architecture allowing for communication with agent 50 and other mobile clients. The knowledge database 70 may include an object image repository configured to the allow the agent 50 to browse for information relating to the object image and send that information to the mobile client 20. In addition, the application platform 65 can access a multi-tenant database 55 which is part of the multi-tenant architecture. The multi-tenant database 55 allows for enterprise customer access and the application platform 65 may be given access to the multi-tenant database dependent upon differing factors such as a session ID associated with the video-chat session.

Figure 2:
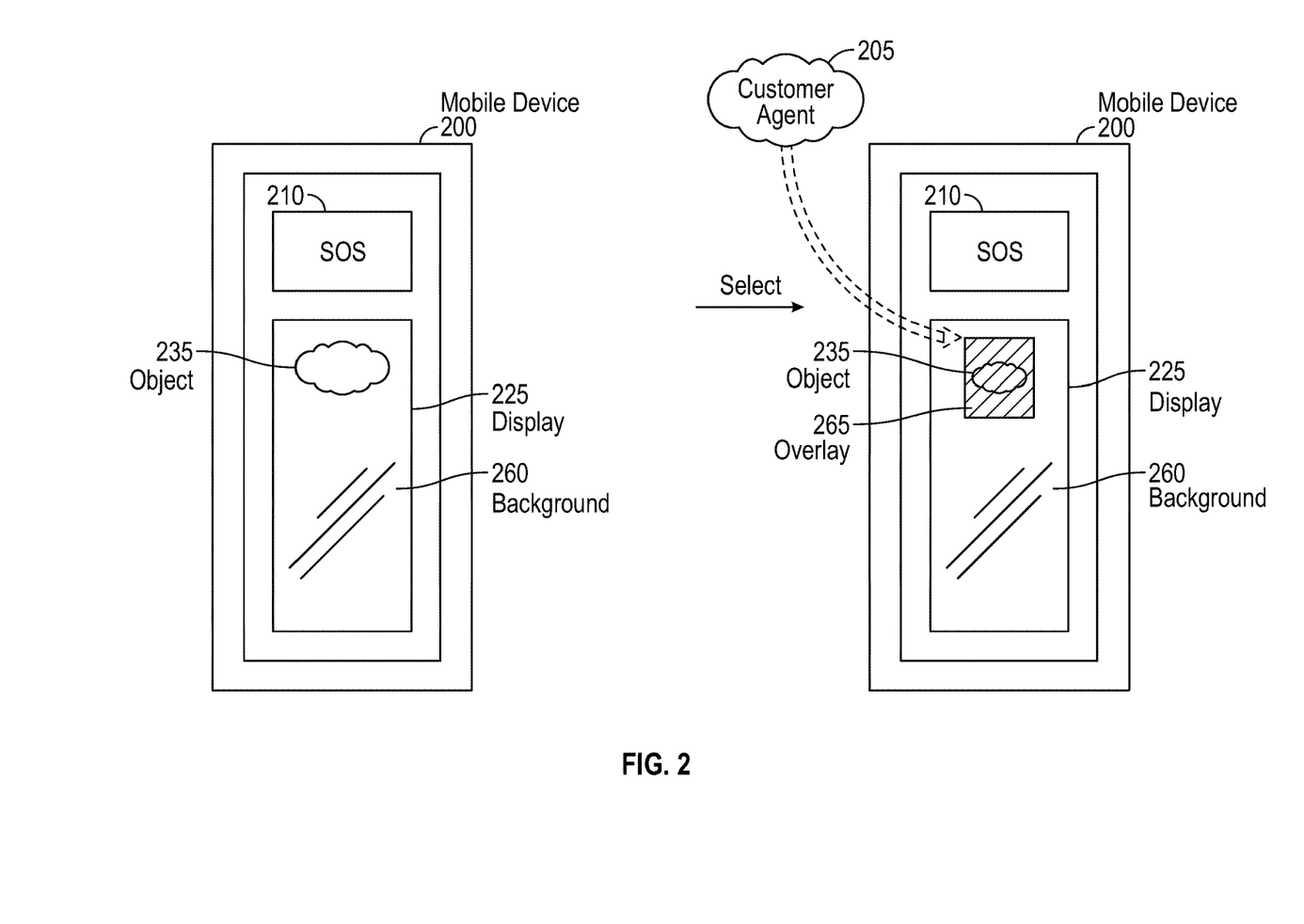
FIG. 2 is an exemplary mobile device diagram illustrating using a shared display in the communication process of the object sharing between the agent and the mobile client in accordance with an embodiment.

With reference to FIG. 2, FIG. 2 is an exemplary mobile device diagram illustrating the shared display of the object sharing process between the agent and the mobile client in accordance with an embodiment. The mobile device 200 includes the mobile client 215 which hosts the in-app application 210 which may be a "snap-in" agent with an UI configure like a button for initiating or terminating the video-chat communications from the mobile client 215, a display 225 with the button UI, an object 235 within the display and the background of the object 230. While the display 225 is illustrated with the object 235 and background of the object 230, the display 225 may also include a UI of a customer agent, other types of media i.e. any kind of information that can be viewed or is transmittable by video-chat applications. The mobile client 215 may reside on a host such as a mobile device 200 which is different and therefore can be considered agnostic and configurable to the mobile device 200 which performs the hosting. Additionally, the mobile client 215 can be configured to reside in part or present in part on other interconnected devices. An example of this multi-device hosting would be interconnections of smart phones coupled with wearable devices were the display may be found on an interconnected device or both the mobile and interconnected device.

With continuing reference to FIG. 2, the object 235 is shown on the mobile client 215 before and after selection by the customer agent 205 and the overlay 265 applied. The object 235 illustrated in conjunction with the display 225 and in-app application 210 maintains a constant ratio of the object 235 to the display 225. In other words, even, if the background 230 changes, the size of the object 235 which is selected with respect to the display 225 is unchanged. When changing the distance of the object 235 selected by a camera (not shown) of the mobile device 200, the object 235 again remains static in size so long as the object 235 was selected prior to change of the camera distance to the object 235. In other words, the computer vision applications used in the object 235 selection are not re-initiated upon movement of the camera. In the same vain, the actual size of the object 235 viewed on both the mobile client 215 and the customer agent 205 shared in display 225 will not change in ratio to the screen size unless there is a movement of the phone away from the object and a re-selection of the object 235 and subsequent re-execution of associated computer vision applications. The computer vision application of block image capture is executed when identifying the object 235 by the customer agent 205, the block image capture of the object 235 on the display 245 will generally be a 1 to 1 representation of the object 235 viewed by the camera of the mobile client 215.

In other words, upon image capture additional scaling will not be immediately performed by the computer vision applications unless settings associated with the object 235 capture process are modified. Hence, by keeping the ratio a 1 to 1 ratio, the customer agent 205 will send an image of the object 235 which is the same in pixel ratio in the display 225 to the mobile device 200. For example, if mobile device 200 is physically by movement distanced from the object 235 both the object 235 and an identifier, which is the overlay 265, of the object will get smaller and subsequent pixel ratios will decrease. Hence, the ratio of the overlay 265, object 235 in the display 225 in both the mobile device 200 and application platform (not shown) of the customer agent 205 act in coordination to maintain consistency in the object appearance to the mobile client 215 and to the customer agent 205.

Figure 3:
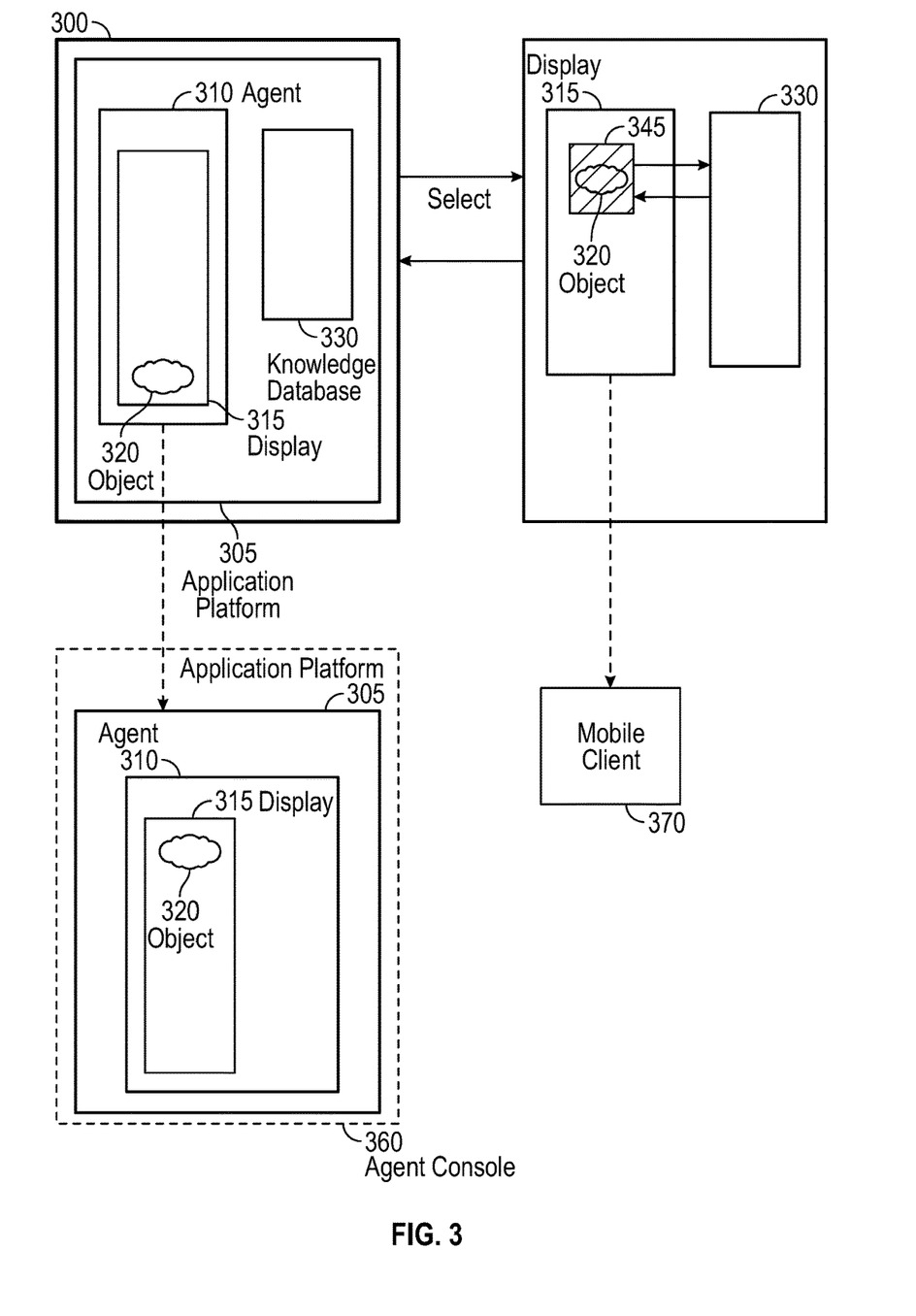
FIG. 3 is an exemplary agent diagram illustrating using the shared display in the communication process of the object sharing between the agent and the mobile client in accordance with an embodiment.

With reference to FIG. 3, FIG. 3 is an exemplary agent diagram illustrating using the shared display in the communication process of the object sharing between the agent and the mobile client in accordance with an embodiment. FIG. 3 illustrates a server 300 that hosts an application platform 305 where a customer agent accesses applications such as the agent 310 using an agent console 360 which includes a user interface of the agent 310 configured to present a display 315 of the communications from the in-app application for video-chat of the mobile client 370 and to access the knowledge database 330. An example of the application platform 305 that allows access to a knowledge database 330 is the Salesforce ServiceCloud® platform which allows a customer agent, by authenticating video-chat session ID from the agent 310, to access the knowledge database 330. When an image search is performed of the object 320, block image data captured from the object 320 as well as additional data added by the customer agent may be used to search the knowledge database 330. In addition, meta data can be extracted from the data packets associated with the captured block image data for searching.

As an example of this search, the image search is performed using a structured query language "SQL" of the knowledge database 330 that may match header information tagged to the packet data of the captured image blocks to identify related block images. When performing this search, call procedures that are used in the search algorithm are performed in branches of trees of the knowledge database 330, the call procedures are not randomly performed but follow paths that are enterprise specific to a customer. This manner of search would allow enterprise customers to prioritize images in the knowledge databases which are known to be searched often by pre-loading the images in a tree structure that anticipates the image related information requests by an agent 310 to a mobile client 370. In other words, information requested more often by the agent 310 would be given higher weighting in structured database. As an example, a block image of an object 320 associated with new products may be of greater interest and hence customer agent requests for related information could be discerned and the preloaded images added with such priority in mind.

Once the object 320 is selected a set of processes of computer vision applications for image capture is initiated for capturing the images in blocks. This block capture of the image 345 can also be used in the overlay process. A multi-stage processing is performed by calling a series of procedures of computer vision applications to perform the image capture of the selected image of the object 320 and extract the associated packet data and create the block image. There are a host of available libraries that provide such processing tools for such computer vision applications.

Open source computer vision "OpenCV" is an example of one such library in which an open-source computer vision and machine learning software procedures are available and may be called in the present image capture processing. For example, in OpenCV a series of routines related to conversion of the color transforms to grayscale, Gaussian blur, canny edge detection, structuring of data elements, image dilation, and ascertaining the object contours are available for use in the capturing processes.

BoofCV is another open source library for real-time computer vision applications BoofCV is similarly organized into multiple types of routines for image processing, features, geometric vision, calibration, recognition, and input/output 10". BoofCV like OpenCV for image processing contains commonly used image processing functions which operate directly on pixels.

These computer vision applications also contain features such as the following: features for extraction algorithms for use in higher level operations; features for calibration which are routines for determining the camera's intrinsic and extrinsic parameters; features for recognition which are for recognition and tracking complex visual objects; features for geometric vision which is composed of routines for processing extracted image features using 2D and 3D geometry; features for visualize which has routines for rendering and displaying extracted features; and features for 10 which is for input and output routines for different data structures. A select subset of such features can be used in the image processing steps of the present disclosure to create among things the block images, the overlay etc.

The information of the block of the image 345 is sent to the knowledge database 330 for search by the customer agent. Information is gathered from the search and may be overlaid on the block of the image 345 in the shared viewed 315 or may be sent in alternate channels such as Salesforce Chatter® to the mobile client 370. Additionally, the customer agent can update the knowledge database 330 with the information gather during the video-chat session.

Once the image is found, information associated with the image and about the image will be passed back to the mobile client 370 for display on the displays of the mobile client and the agent. The SOS SDK application has a reset function that allows this kind of information to be customizable by the agent each time it is sent. Hence, the added information can be changed using the reset function to allow the information displayed on the image to be changed.

Figure 4:
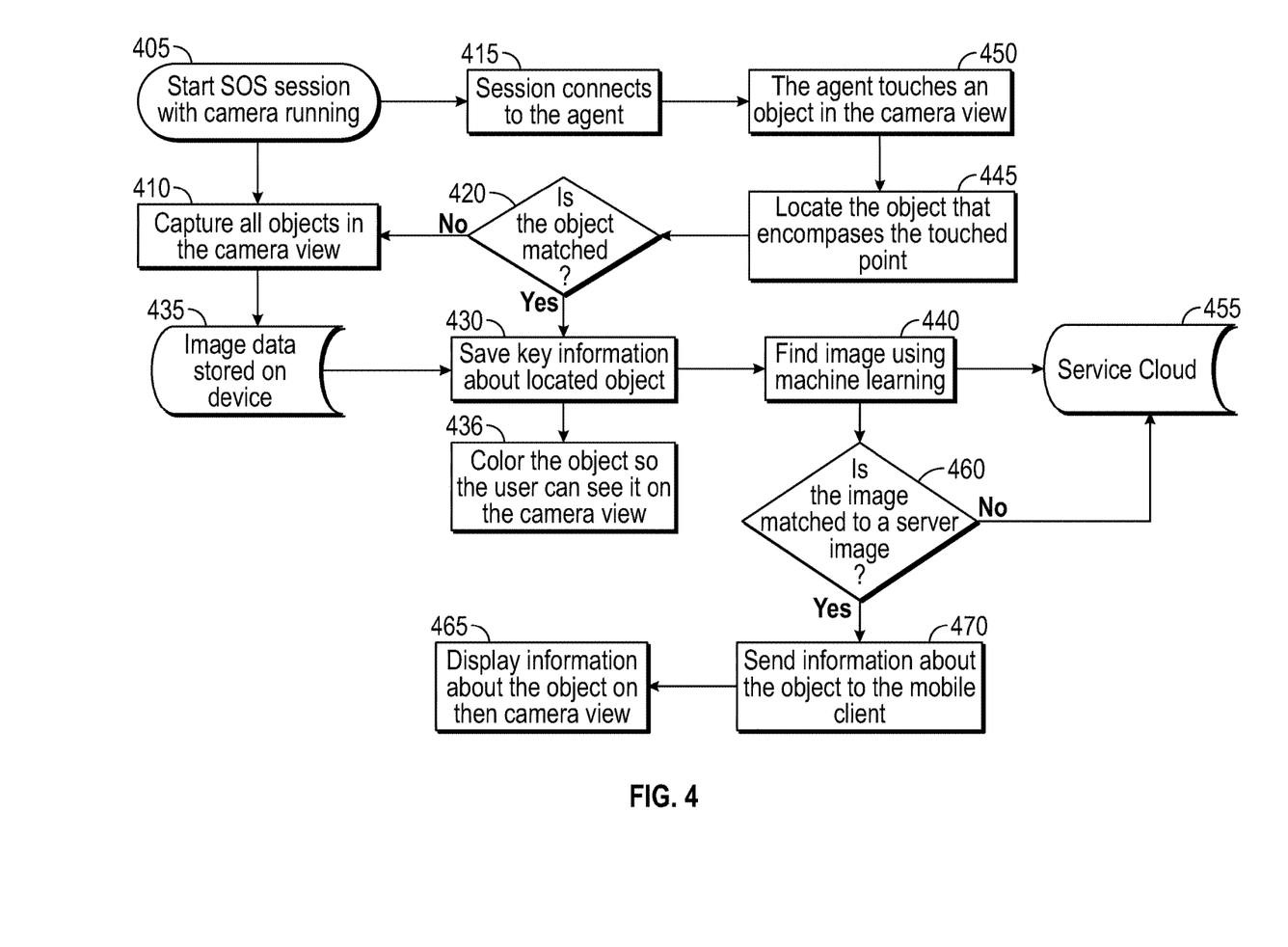
FIG. 4 is an exemplary flowchart illustrating a layout of the operation of the communication process of the object sharing of the mobile client and agent in accordance with an embodiment.

Referring to FIG. 4, FIG. 4 is an exemplary flowchart illustrating a layout of the operation of the communication process of the object sharing of the mobile client and agent in accordance with an embodiment. Initially, a video-chat session is started 405 with a camera on the side of the mobile client in operation. The camera may be part of the mobile device hosting the mobile client or may be part of an interconnected device. Nevertheless, a camera is operated that is capable of communicating and providing images to the display of the mobile client and the display of the agent. Generally, the camera provides video in the format of MPEG video streaming data but other similar alternatives may also be used. In an exemplary embodiment, a Salesforce® SOS™ session with a camera running is commenced at 405. The session connects with the agent 415 or in the alternative in the session, capture routines may be initiated to capture all objects in the operated camera view 410 hence omitting the need for agent identification of the object 450.

Alternately, as mentioned, if the objects are not captured 410, then a customer agent physically touches the display to identify and select an object 450 in the camera view. Then in the following step 445, the object is located that encompasses the touch point which is the physical point identified by the agent. Procedures as described above from OpenCV or other open sources foundations are applied for object detection and block image capture. Next at 420, a determination is performed if the object is matched, that is if the touch location coordinates are matched to an object. If not matched, then all the objects are captured at 410 in the view to resolve the lack of match impediment. At 425, the image data is stored on the mobile device in non-volatile memory. The non-volatile memory may be random access memory "RAM" or programmable FLASH memory. In either case whether the object is matched or not at 420, the flow proceeds to 430 were key information about the located object is saved. Next, the flow proceeds in two separate process paths. In one path at 440 artificial intelligence techniques are applied including machine learning to retrieve information about the object from the ServiceCloud at 455 and determine whether there is a match with an image already stored at the server at 460. If there is no match the information including session data is stored in the ServiceCloud 455. Alternatively, if there is a match, at 470 additional information is retrieved and sent to the mobile client. The additional information may be sent and overlaid or displayed in a manner were it is associated with the image at the display of the mobile client at 465, or in other instances, the information can be delivered to the mobile client in a host of other communication paths such as Salesforce Chatter®, instant messaging, email, or by various social networks.

Figure 5:
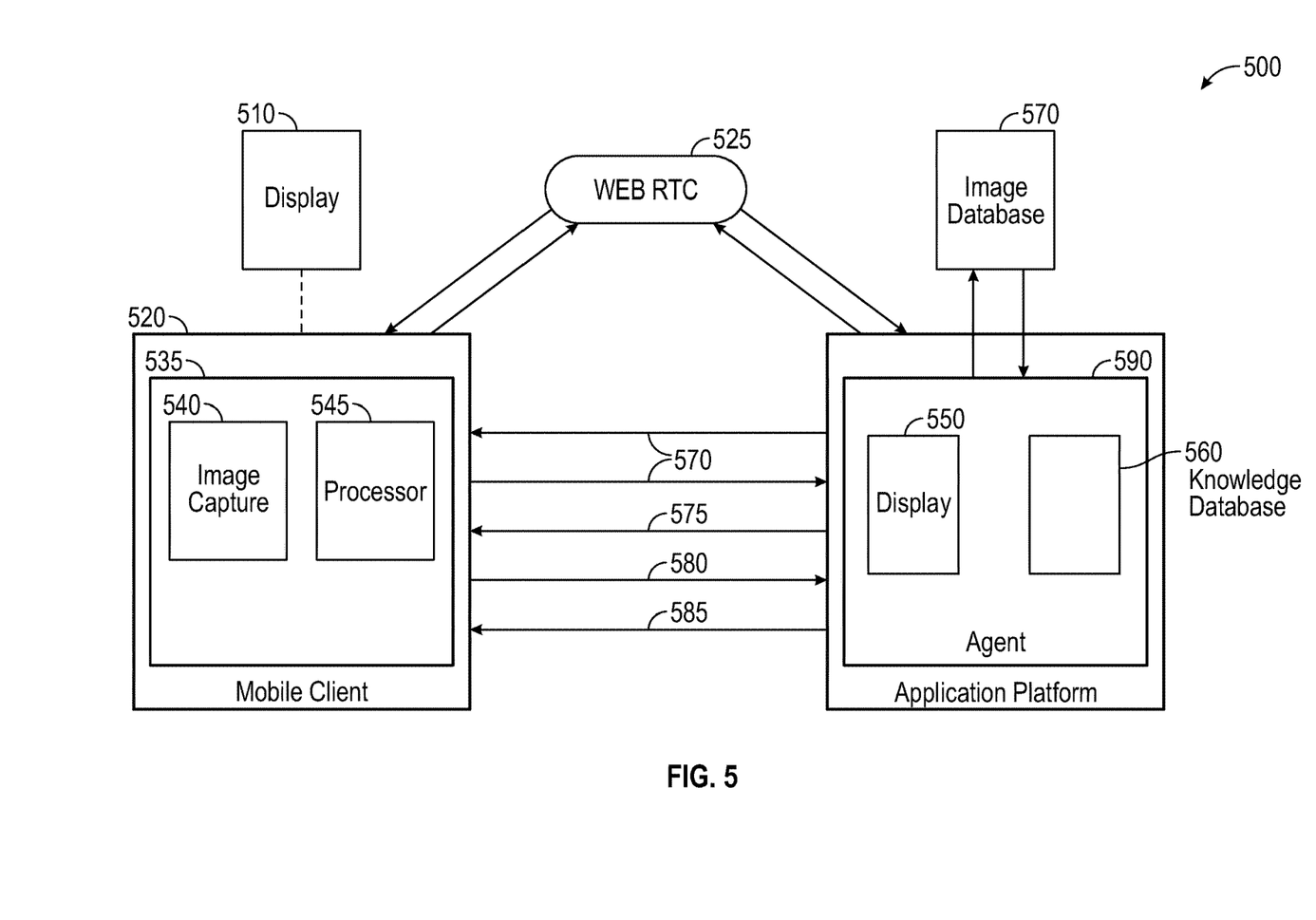
FIG. 5 is an exemplary system diagram illustrating a system of components of the communication process using the shared display of the object sharing of the mobile client and agent in accordance with an embodiment.

With reference to FIG. 5, FIG. 5 is an exemplary system diagram illustrating a system of components of the communication process using the shared display of the object sharing of the mobile client and agent in accordance with an embodiment. A communication system 500 of the mobile client and agent with the WebRTC service provider is illustrated. The communication system 500 includes a camera view 510 of the mobile client 520 and the corresponding view of the agent 550 for video-chat. The camera view 510 of the mobile client at the mobile device is view used for capturing objects at the agent 530 which are identified from the agent view which is as explained the camera view 510. Additionally, an application platform 590 supports hosts the agent 530 which includes the UI for the agent 550 of the display and is connected to the knowledge database 560 which containing information about the images and objects. Additionally, a multi-tenant image database 570 is connected to the application platform 590 allowing for access based on a session ID identifier of an enterprise client associated with the mobile client. The mobile client 520 includes the in-app video-chat application 535 hosted by the mobile client 520 and includes image capture routines 540 process by a processor 545 locally located at the mobile client. The local processor can process all the binary data captured by the camera connected to the mobile client. The in-app application in one instance may be Salesforce Service SOS® hosted by the Salesforce® SDK which can be considered the in-app platform for the mobile client 520. The camera having display which is the camera view 510 is connected to the in-app platform of the mobile client 520. The WebRTC provides real-time multimedia applications (i.e. video-chat communication) on the web, without requiring plugins, downloads or installs. WebRTC consists of several interrelated APIs and protocols which are arranged intermingling to enable signaling and connecting to a server from a different platform mobile device. The communication of information flow is sent 565 bi-directionally to and from the WebRTC provider 525 to the mobile client 520 and the agent 530.

The communication process between the mobile client 520 and the agent 530 can be summarized in a multi-step process. In the initial step at 570, communication to the application platform 590, the Salesforce ServiceCloud® from the mobile client 520 is commenced. At the second step at 575, agent 530 selects an object from the mobile client 520. In the third step at 580, an image of the captured object is transferred to the application platform. At the final step at 585, additional information about the object is transferred from the application platform 590 to the mobile client 520.

Figure 6:
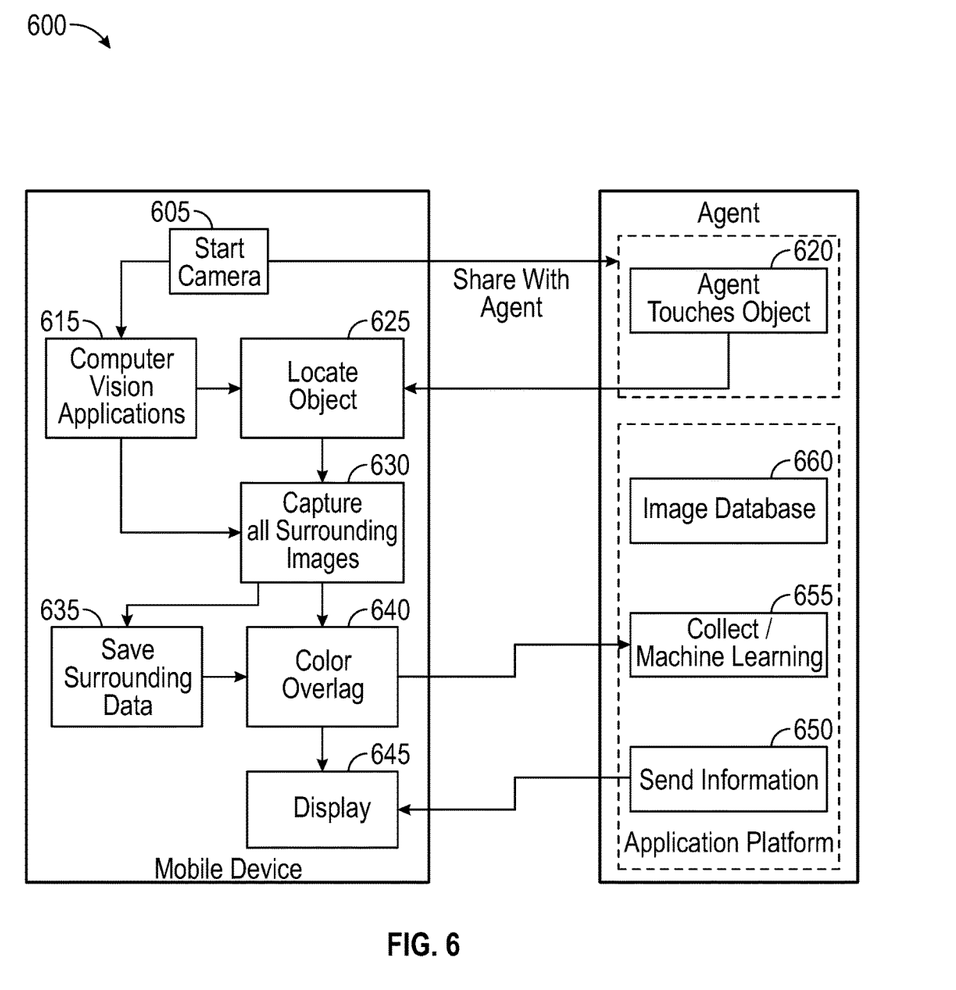
FIG. 6 is an exemplary flowchart illustrating a layout of the operation of the communication process using the shared display of the object sharing of the mobile client and agent in accordance with an embodiment.

With reference to FIG. 6, FIG. 6 is an exemplary flowchart illustrating a layout of the operation of the communication process using the shared display of the object sharing of the mobile client and agent in accordance with an embodiment. the operation of the software procedures of the mobile client and the agent are further described and illustrated in the agent/mobile client system 600. Initially, the view of the camera connected to the mobile device is initiated at 605. The view of the camera is shared with the agent at 610. A customer agent using the agent physically touches an object on the camera view at 620. In parallel, a set of computer vision applications is processed for enabling image capture locally by a processor of the mobile agent at 615. The computer vision applications enable the locating of an object that encompasses the physical touch of the customer agent at 620. Executing the computer vision applications at 615, the processor of the mobile device at 625 locates the object that encompasses a touch point which is the approximate center of the customer agent physical touch.

Again, executing the computer vision applications at 615, the mobile client at 630 captures all the surrounding images and also the greyscale values of the object which has been selected from the prior steps 620 and 625. Here in addition to saving the surrounding data at an image database locally at the mobile client at 635 an overlay which is light or translucent is applied at 640 covering the object to change the image color of the object for easier identification from the background. Then, by using image data from the image data at the server which is connectable by the application platform ServiceCloud® at 660, machine learning and artificial intelligence techniques are applied at 655 to identify the object from a collection of images from the image database 660. Next, the existing information about the object is gathered at 650 and displayed in the camera view at 645 so that the mobile client can view the existing information.

Figure 7:
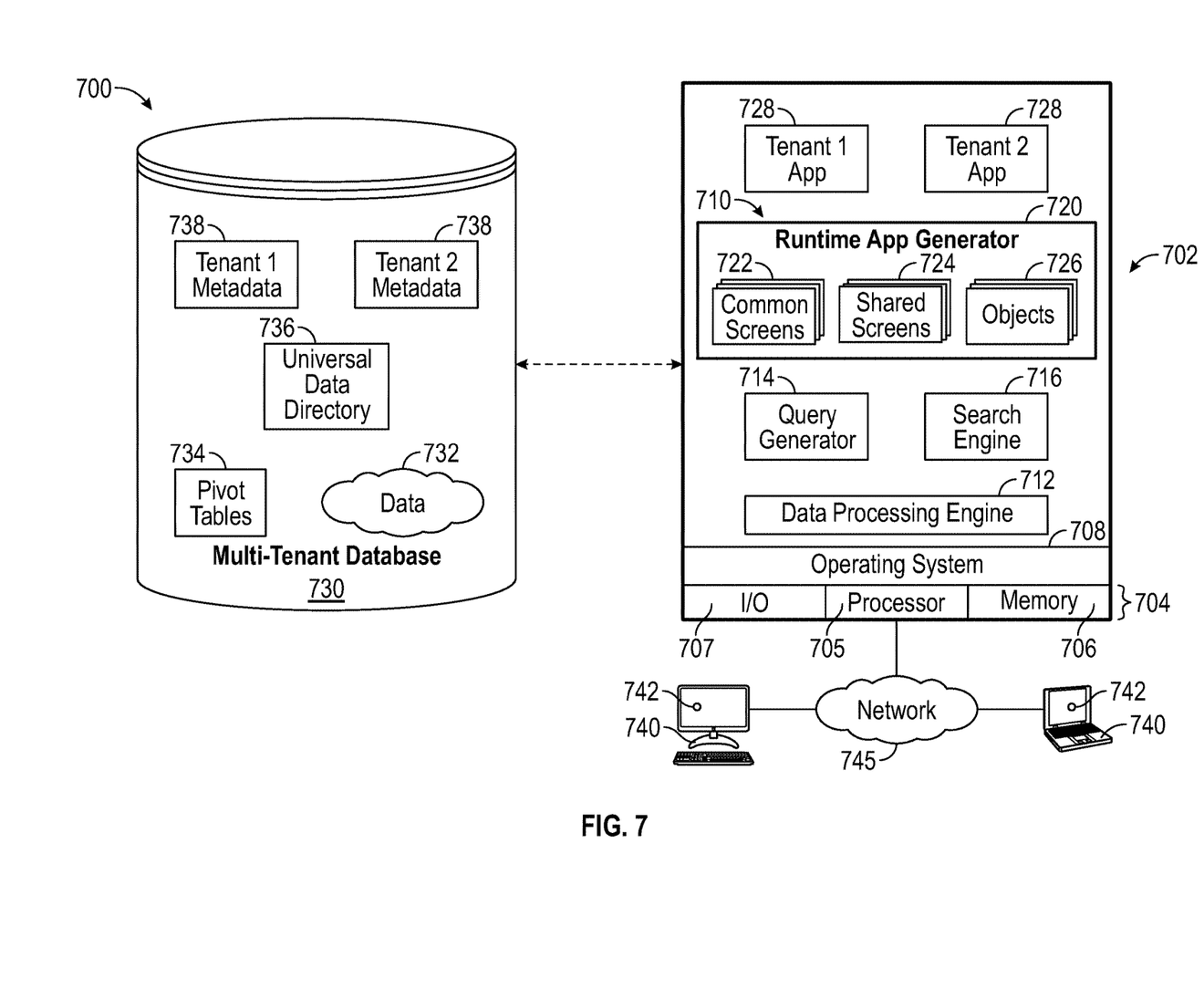
FIG. 7 is a schematic block diagram of a multi-tenant computing environment for use in conjunction with the communication process of the object sharing of the mobile client and agent in accordance with an embodiment.

With reference to FIG. 7, FIG. 7 is a schematic block diagram of a multi-tenant computing environment for use in conjunction with the communication process of the object sharing of the mobile client and agent in accordance with an embodiment. A server may be shared between multiple tenants, organizations, or enterprises, referred to herein as a multi-tenant database. In the exemplary disclosure, video-chat data and services are provided via a network 745 to any number of tenant devices 740, such as desk tops, laptops, tablets, smartphones, Google Glass™, and any other computing device implemented in an automobile, aircraft, television, or other business or consumer electronic device or system, including web tenants.

Each application 728 is suitably generated at run-time (or on-demand) using a common type of application platform 710 that securely provides access to the data 732 in the multi-tenant database 730 for each of the various tenant organizations subscribing to the service cloud 700. In accordance with one non-limiting example, the service cloud 700 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 730. In this regard, each tenant includes one or more users and/or groups associated with, authorized by, or otherwise belonging to that respective tenant. Stated another way, each respective user within the multi-tenant system of the service cloud 700 is associated with, assigned to, or otherwise belongs to a particular one of the plurality of enterprises supported by the system of the service cloud 700.

Each enterprise tenant may represent a company, corporate department, business or legal organization, and/or any other entities that maintain data for particular sets of users (such as their respective employees or customers) within the multi-tenant system of the service cloud 700. Although multiple tenants may share access to the server 702 and the multi-tenant database 730, the particular data and services provided from the server 702 to each tenant can be securely isolated from those provided to other tenants. The multi-tenant architecture therefore allows different sets of users to share functionality and hardware resources without necessarily sharing any of the data 732 belonging to or otherwise associated with other organizations.

The multi-tenant database 730 may be a repository or other data storage system capable of storing and managing the data 732 associated with any number of tenant organizations. The multi-tenant database 730 may be implemented using conventional database server hardware. In various embodiments, the multi-tenant database 730 shares the processing hardware 704 with the server 702. In other embodiments, the multi-tenant database 730 is implemented using separate physical and/or virtual database server hardware that communicates with the server 702 to perform the various functions described herein.

In an exemplary embodiment, the multi-tenant database 730 includes a database management system or other equivalent software capable of determining an optimal query plan for retrieving and providing a particular subset of the data 732 to an instance of application (or virtual application) 728 in response to a query initiated or otherwise provided by an application 728, as described in greater detail below. The multi-tenant database 730 may alternatively be referred to herein as an on-demand database, in that the multi-tenant database 730 provides (or is available to provide) data at run-time to on-demand virtual applications 728 generated by the application platform 710, as described in greater detail below.

In practice, the data 732 may be organized and formatted in any manner to support the application platform 710. In various embodiments, the data 732 is suitably organized into a relatively small number of large data tables to maintain a semi-amorphous "heap"-type format. The data 732 can then be organized as needed for a particular virtual application 728. In various embodiments, conventional data relationships are established using any number of pivot tables 734 that establish indexing, uniqueness, relationships between entities, and/or other aspects of conventional database organization as desired. Further data manipulation and report formatting is generally performed at run-time using a variety of metadata constructs. Metadata within a universal data directory (UDD) 736, for example, can be used to describe any number of forms, reports, workflows, user access privileges, business logic and other constructs that are common to multiple tenants.

Tenant-specific formatting, functions and other constructs may be maintained as tenant-specific metadata 738 for each tenant, as desired. Rather than forcing the data 732 into an inflexible global structure that is common to all tenants and applications, the multi-tenant database 730 is organized to be relatively amorphous, with the pivot tables 734 and the metadata 738 providing additional structure on an as-needed basis. To that end, the application platform 710 suitably uses the pivot tables 734 and/or the metadata 738 to generate "virtual" components of the virtual applications 728 to logically obtain, process, and present the relatively amorphous data from the multi-tenant database 730.

The server 702 may be implemented using one or more actual and/or virtual computing systems that collectively provide the dynamic type of application platform 710 for generating the virtual applications 728. For example, the server 702 may be implemented using a cluster of actual and/or virtual servers operating in conjunction with each other, typically in association with conventional network communications, cluster management, load balancing and other features as appropriate. The server 702 operates with any sort of processing hardware 704 which is conventional, such as a processor 705, memory 706, input/output features 707 and the like. The input/output features 707 generally represent the interface(s) to networks (e.g., to the network 745, or any other local area, wide area or other network), mass storage, display devices, data entry devices and/or the like.

The processor 705 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 706 represents any non-transitory short or long term storage or other computer-readable media capable of storing programming instructions for execution on the processor 705, including any sort of random access memory (RAM), read only memory (ROM), flash memory, magnetic or optical mass storage, and/or the like. The computer-executable programming instructions, when read and executed by the server 702 and/or processor 705, cause the server 702 and/or processor 705 to create, generate, or otherwise facilitate the application platform 710 and/or virtual applications 728 and perform one or more additional tasks, operations, functions, and/or processes described herein. It should be noted that the memory 706 represents one suitable implementation of such computer-readable media, and alternatively or additionally, the server 702 could receive and cooperate with external computer-readable media that is realized as a portable or mobile component or platform, e.g., a portable hard drive, a USB flash drive, an optical disc, or the like.

The application platform 710 is any sort of software application or other data processing engine that generates the virtual applications 728 that provide data and/or services to the tenant devices 740. In a typical embodiment, the application platform 710 gains access to processing resources, communications interface and other features of the processing hardware 704 using any sort of conventional or proprietary operating system 708. The virtual applications 728 are typically generated at run-time in response to input received from the tenant devices 740. For the illustrated embodiment, the application platform 710 includes a bulk data processing engine 712, a query generator 714, a search engine 716 that provides text indexing and other search functionality, and a runtime application generator 720. Each of these features may be implemented as a separate process or other module, and many equivalent embodiments could include different and/or additional features, components or other modules as desired.

The runtime application generator 720 dynamically builds and executes the virtual applications 728 in response to specific requests received from the tenant devices 740. The virtual applications 728 are typically constructed in accordance with the tenant-specific metadata 738, which describes the particular tables, reports, interfaces and/or other features of the particular application 728. In various embodiments, each virtual application 728 generates dynamic web content that can be served to a browser or other tenant program 742 associated with its tenant device 740, as appropriate.

The runtime application generator 720 suitably interacts with the query generator 714 to efficiently obtain data 732 from the multi-tenant database 730 as needed in response to input queries initiated or otherwise provided by users of the tenant devices 140. In a typical embodiment, the query generator 714 considers the identity of the user requesting a particular function (along with the user's associated tenant), and then builds and executes queries to the multi-tenant database 730 using system-wide metadata 736, tenant specific metadata, pivot tables 734, and/or any other available resources. The query generator 714 in this example therefore maintains security of the common database by ensuring that queries are consistent with access privileges granted to the user and/or tenant that initiated the request.

With continued reference to FIG. 7, the bulk data processing engine 712 performs bulk processing operations on the data 732 such as uploads or downloads, updates, online transaction processing, and/or the like. In many embodiments, less urgent bulk processing of the data 732 can be scheduled to occur as processing resources become available, thereby giving priority to more urgent data processing by the query generator 714, the search engine 716, the virtual applications 728, etc.

In exemplary embodiments, the application platform 710 is utilized to create and/or generate data-driven virtual applications 728 for the tenants that they support. Such virtual applications 728 may make use of interface features such as custom (or tenant-specific) screens 724, standard (or universal) screens 722 or the like. Any number of custom and/or standard objects 726 may also be available for integration into tenant-developed virtual applications 728. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 732 associated with each virtual application 728 is provided to the multi-tenant database 730, as appropriate, and stored until it is requested or is otherwise needed, along with the metadata 738 that describes the particular features (e.g., reports, tables, functions, objects, fields, formulas, code, etc.) of that particular virtual application 728. For example, a virtual application 728 may include a number of objects 726 accessible to a tenant, wherein for each object 726 accessible to the tenant, information pertaining to its object type along with values for various fields associated with that respective object type are maintained as metadata 738 in the multi-tenant database 730. In this regard, the object type defines the structure (e.g., the formatting, functions and other constructs) of each respective object 726 and the various fields associated therewith.

Still referring to FIG. 7, the data and services provided by the server 702 can be retrieved using any sort of personal computer, mobile telephone, tablet or other network-enabled tenant device 740 on the network 745. In an exemplary embodiment, the tenant device 740 includes a display device, such as a monitor, screen, or another conventional electronic display capable of graphically presenting data and/or information retrieved from the multi-tenant database 730, as described in greater detail below.

Typically, the user operates a conventional browser application or other tenant program 742 executed by the tenant device 740 to contact the server 702 via the network 745 using a networking protocol, such as the hypertext transport protocol (HTTP) or the like. The user typically authenticates his or her identity to the server 702 to obtain a session identifier ("Session ID") that identifies the user in subsequent communications with the server 702. When the identified user requests access to a virtual application 728, the runtime application generator 720 suitably creates the application at run time based upon the metadata 738, as appropriate. However, if a user chooses to manually upload an updated file (through either the web based user interface or through an API), it will also be shared automatically with all of the users/devices that are designated for sharing.

As noted above, the virtual application 728 may contain Java, ActiveX, or other content that can be presented using conventional tenant software running on the tenant device 740; other embodiments may simply provide dynamic web or other content that can be presented and viewed by the user, as desired. As described in greater detail below, the query generator 714 suitably obtains the requested subsets of data 732 from the multi-tenant database 730 as needed to populate the tables, reports or other features of the particular virtual application 728. In various embodiments, application 728 embodies the functionality of an interactive performance review template linked to a database of performance metrics, as described below in connection with FIGS. 1-6.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

"Node/Port"—As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node). As used herein, a "port" means a node that is externally accessible via, for example, a physical connector, an input or output pin, a test probe, a bonding pad, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 7 depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The various tasks performed in connection with viewing, object identification, sharing and information retrieving processes between the mobile client and agent in video-chat applications may be performed by software, hardware, firmware, or any combination thereof. For illustrative purposes, the following description of object capture, shared display, and process may refer to elements mentioned above in connection with FIGS. 1-7. In practice, portions of process of FIGS. 1-7 may be performed by different elements of the described system, e.g., mobile clients, agents, in-app applications etc. It should be appreciated that process of FIGS. 1-7 may include any number of additional or alternative tasks, the tasks shown in FIGS. 1-7 need not be performed in the illustrated order, and process of the FIGS. 1-7 may be incorporated into a more comprehensive procedure or process having additional functionality not described in detail herein. Moreover, one or more of the tasks shown in FIG. 1-7 could be omitted from an embodiment of the process shown in FIGS. 1-7 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for identifying object information in a video chat application hosted by a server system, comprising:
presenting a shared view for an agent device and a client device during a video chat session using the video chat application hosted by the server system;

receiving, by the server system, object images captured by the client device during the video chat session;

receiving a touch selection of an object from the captured object images through the agent device during the video chat session wherein the touch selection can be received from either the agent device or the client device during the video chat session;

identifying, by the server system, the selected object by determining an approximate center of the touch selection;

overlaying the selected object with an image color to identify the selected object within the shared view of the video chat session, wherein the overlaid image color is scaled appropriately in the display of the agent device and the display of the client device in accordance with the size of the selected object in the respective display;

generating, by the server system, object information to identify features of the selected object;

sending generated object information of the selected object to a database system associated with the server system to search for and retrieve data related to the generated object information stored by the database system;

receiving, from the database system, data related to the object information; and sending the received data related to the object information from the server system to the client device.

2. The method of claim 1, wherein the database system comprises a knowledge database of data related to the object information.

3. The method of claim 1, further comprising:
capturing the images of the objects with a camera coupled to the client device associated with the server system.

4. The method of claim 1, further comprising:
identifying, by locations within the images by the server, the features of the objects in the session of the video chat application.

5. The method of claim 1, further comprising:
receiving instructions by the server system to perform the search of the database system for retrieving the related data.

6. The method of claim 5, further comprising:
applying artificial intelligence solutions, by the server system, to perform the search of the database system for retrieving the related data.

7. The method of claim 1, further comprising:
overlaying, by the server system, the features of the objects captured in a display of the server system to distinguish the features from a background of the display.

8. The method of claim 1, further comprising:
identifying the features of the object within an agent app hosted by the server system.

9. The method of claim 8, further comprising:
identifying, by locations within the images in the agent app by the server system, the features of the objects in the session of the video chat application.

10. A computer program product tangibly embodied in a computer-readable storage device and comprising instructions configurable to be executed by a processor to perform a method for processing requests by a server system in a video chat application, the method comprising:
presenting a shared view for an agent device and a client device during a video chat session using the video chat application hosted by the server system;

receiving, by the server system, object images captured by the client device during the video chat session;

receiving a touch selection of an object from the captured object images through the agent device during the video chat session wherein the touch selection can be received from either the agent device or the client device during the video chat session;

identifying, by the server system, the selected object by determining an approximate center of the touch selection;

overlaying the selected object with an image color to identify the selected object within the shared view of the video chat session, wherein the overlaid image color is scaled appropriately in the display of the agent device and the display of the client device in accordance with the size of the selected object in the respective display;

generating, by the server system, object information to identify features of the selected object;

sending generated object information of the selected object to a database system associated with the server system to search for and retrieve data related to the generated object information stored by the database system;

receiving, from the database system, data related to the object information; and sending the received data related to the object information from the server system to the client device.

11. The method of claim 10, wherein the database system comprises a knowledge database of data related to the object information.

12. The method of claim 10, further comprising:
capturing the images of the objects with a camera coupled to the client device associated with the server system.

13. The method of claim 10, further comprising:
identifying, by locations within the images by the server, the features of the objects in the session of the video chat application.

14. The method of claim 10, further comprising:
receiving instructions by the server system to perform the search of the database system for retrieving the related data.

15. The method of claim 14, further comprising:
applying artificial intelligence solutions, by the server system, to perform the search of the database system for retrieving the related data.

16. The method of claim 10, further comprising:
overlaying, by the server system, the features of the objects captured in a display of the server system to distinguish the features from a background of the display.

17. The method of claim 10, the server system further comprising:
identifying the features of the object within an agent app hosted by the server system.

18. The method of claim 17, further comprising:
identifying, by locations within the images in the agent app by the server system, the features of the objects in the session of the video chat application.

19. A server system comprising:
at least one processor;
a database system; and
at least one computer-readable storage device comprising instructions configurable to be executed by the at least one processor to perform a method for processing requests to the database system using a video chat application, the method comprising:

presenting a shared view for an agent device and a client device during a video chat session using the video chat application hosted by the server system;

receiving, by the server system, object images captured by the client device during the video chat session;

receiving a touch selection of an object from the captured object images through the agent device during the video chat session wherein the touch selection can be received from either the agent device or the client device during the video chat session;

identifying, by the server system, the selected object by determining an approximate center of the touch selection;

overlaying the selected object with an image color to identify the selected object within the shared view of the video chat session, wherein the overlaid image color is scaled appropriately in the display of the agent device and the display of the client device in accordance with the size of the selected object in the respective display;

generating, by the server system, object information to identify features of the selected object;

sending generated object information of the selected object to a database system associated with the server system to search for and retrieve data related to the generated object information stored by the database system;

receiving, from the database system, data related to the object information; and sending the received data related to the object information from the server system to the client device.

20. The system of claim 19 wherein the database system comprises a multi-tenant database system.

* * * * *